US011852289B2

United States Patent
Barilotti et al.

(10) Patent No.: US 11,852,289 B2
(45) Date of Patent: Dec. 26, 2023

(54) WEARABLE ELECTRONIC DEVICE HOLDER

(71) Applicant: FREEDOM AND CLARITY, LLC, Philadelphia, PA (US)

(72) Inventors: Christy Barilotti, Newtown Square, PA (US); Ryan P. Langeveld, Lansdale, PA (US); Meredith Brooks Ingrassia, North Wales, PA (US)

(73) Assignee: Freedom and Clarity, LLC, Philadelphia, PA (US)

( * ) Notice: Subject to any disclaimer, the term of this patent is extended or adjusted under 35 U.S.C. 154(b) by 102 days.

(21) Appl. No.: 17/419,482

(22) PCT Filed: Jan. 3, 2020

(86) PCT No.: PCT/US2020/012190
§ 371 (c)(1),
(2) Date: Jun. 29, 2021

(87) PCT Pub. No.: WO2020/142695
PCT Pub. Date: Jul. 9, 2020

(65) Prior Publication Data
US 2022/0074543 A1    Mar. 10, 2022

Related U.S. Application Data

(60) Provisional application No. 62/788,302, filed on Jan. 4, 2019.

(51) Int. Cl.
*F16M 13/04* (2006.01)
*A45F 5/00* (2006.01)
(Continued)

(52) U.S. Cl.
CPC ............... *F16M 13/04* (2013.01); *A45F 5/00* (2013.01); *F16M 11/2021* (2013.01);
(Continued)

(58) Field of Classification Search
CPC ........ A45F 2005/006; A45F 2200/0516; A45F 2200/0525; F16M 13/04; F16M 11/2021;
(Continued)

(56) References Cited

U.S. PATENT DOCUMENTS 3,225,982 A    12/1965    Melton
8,408,513 B2 *  4/2013    Smith ................... A45F 5/004
                                              248/693

(Continued)

FOREIGN PATENT DOCUMENTS

EP          3543587        9/2019

OTHER PUBLICATIONS

International Search Report from corresponding International Application No. PCT/US2020/012190; dated Mar. 10, 2020.

*Primary Examiner* — Adam J Waggenspack
(74) *Attorney, Agent, or Firm* — Duane Morris LLP

(57) ABSTRACT

A device includes a wearable portion and a support portion. The wearable portion includes an elongate member and a coupler connected to the elongate member. The elongate member is formed in a loop such that the elongate member is positionable around a neck of a user with the coupler positioned on a torso of the user. The support portion includes an attachment member, an arm, and a retainer. The arm extends from a first end to a second end. The first end is coupled to the attachment member. The retainer is coupled to the second end of the arm and is configured to retain a personal electronic device. The attachment member is releasably attachable to the coupler such that with the attachment member attached to the coupler the device supports the personal electronic device.

19 Claims, 19 Drawing Sheets

(51) Int. Cl.
   *F16M 11/20*      (2006.01)
   *H04M 1/05*       (2006.01)
(52) U.S. Cl.
   CPC ......... *H04M 1/05* (2013.01); *A45F 2005/006* (2013.01); *A45F 2200/0516* (2013.01); *A45F 2200/0525* (2013.01); *F16M 2200/024* (2013.01); *F16M 2200/065* (2013.01); *F16M 2200/068* (2013.01)
(58) Field of Classification Search
   CPC ....... F16M 2200/024; F16M 2200/065; F16M 2200/068
   See application file for complete search history.

(56) References Cited

U.S. PATENT DOCUMENTS

| | | | |
|---|---|---|---|
| 9,125,475 B2* | 9/2015 | Garza, Jr. | H04M 1/05 |
| 10,260,677 B1* | 4/2019 | Catlin | F16M 11/10 |
| 10,393,312 B2* | 8/2019 | Pombo | F16M 11/2078 |
| 10,441,066 B2* | 10/2019 | Robinson | F16C 11/06 |
| 2007/0164987 A1 | 7/2007 | Graham | |
| 2008/0023508 A1* | 1/2008 | Harchol | A45F 5/02 |
| | | | 224/183 |
| 2010/0025444 A1 | 2/2010 | Tipton et al. | |
| 2010/0171021 A1 | 7/2010 | Smith | |
| 2014/0209777 A1* | 7/2014 | Klemin | F16M 11/041 |
| | | | 29/525.08 |
| 2015/0195392 A1 | 7/2015 | Nissenbaum | |
| 2016/0252800 A1* | 9/2016 | Jeong | F16M 13/04 |
| | | | 224/576 |
| 2018/0116383 A1* | 5/2018 | McGahey | A45F 5/00 |
| 2018/0325247 A1* | 11/2018 | Vlassis | A45F 5/02 |

\* cited by examiner

WEARABLE ELECTRONIC DEVICE HOLDER

CROSS-REFERENCE TO RELATED APPLICATIONS

This application is a National Stage Application, filed under 35 U.S.C. § 371, of International Patent Application No. PCT/US2020/012190, filed on Jan. 3, 2020, which claims priority to U.S. Provisional Application Ser. No. 62/788,302, filed on Jan. 4, 2019, entitled "WEARABLE ELECTRONIC DEVICE HOLDER," the disclosures of which are incorporated by reference herein in their entireties.

BACKGROUND

Currently there are a number of solutions for wearable electronic device holders. Some of these solutions attempt to attach the portable electronic device to the body, but these solutions fail to meet user's needs because they are clumsy, not sturdy, and obstructive. Some products position the portable electronic device too closely to the face of the user to be able to take an acceptable selfie picture or video. Other products allow for the attachment of a camera to the head but do not allow a person to talk into a phone and see the screen at the same time.

SUMMARY

In one aspect, a device includes a wearable portion and a support portion. The wearable portion includes an elongate member and a coupler connected to the elongate member. The elongate member is formed in a loop such that the elongate member is positionable around a neck of a user with the coupler positioned on a torso of the user. The support portion includes an attachment member, an arm, and a retainer. The arm extends from a first end to a second end. The first end is coupled to the attachment member. The retainer is coupled to the second end of the arm. The retainer is configured to retain a personal electronic device. The attachment member of the support portion is releasably attachable to the coupler of the wearable portion such that with the attachment member attached to the coupler the device supports the personal electronic device.

In another aspect, a device includes a wearable portion and a support portion. The wearable portion is configured to be wearable by a user. The wearable portion includes a coupler including a first magnet. The support portion includes an attachment member, an arm, and a retainer. The attachment member includes a second magnet. The arm extends from a first end to a second end. The first end is coupled to the attachment member. The retainer is coupled to the second end of the arm. The retainer is configured to retain a personal electronic device. The attachment member of the support portion is releasably attachable to the coupler of the wearable portion using the first magnet and the second magnet such that with the attachment member coupled to the coupler the device supports the personal electronic device.

BRIEF DESCRIPTION OF THE DRAWINGS

The features of the embodiments described herein will be more fully disclosed in the following detailed description, which is to be considered together with the accompanying drawings wherein like numbers refer to like parts and further wherein.

DETAILED DESCRIPTION

Figure 1:
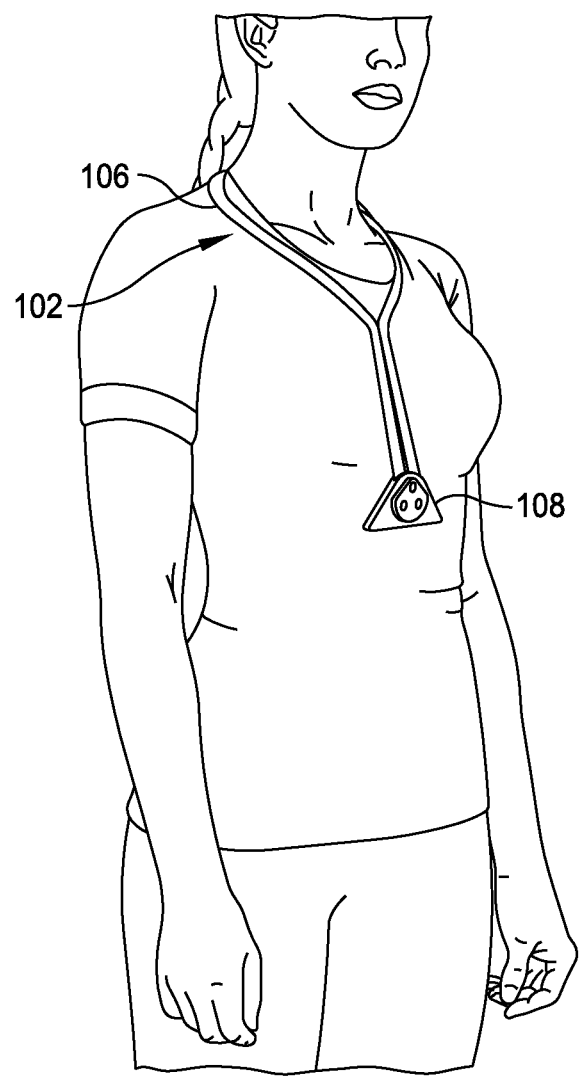
FIG. 1 shows the wearable portion of a device according to one embodiment described herein, being worn by a user.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. "Personal electronic device" as used herein can mean, for example, a smartphone, a tablet computer, a still or video camera, a personal digital assistant, a portable video game system, or any other portable electronic device.

It is desirable to have a wearable portable electronic device holder which allows one to be truly hands free. Furthermore, it is desirable to have a device that a user can wear throughout the day over or under their clothing and can take on and off easily via magnets, for example, without the device being obtrusive. Still further, it is desirable to have a discreet light-weight personal electronic device holder such that people with wrist injuries or back, arm, or neck pain or those who suffer from "tech neck" can still use their portable electronic device without creating more pain. In our modern times, taking the correct selfie or having the ability to video chat at the proper angle has become a priority. The disclosed device advantageously fills these needs and addresses the aforementioned deficiencies by providing a light weight and wearable personal electronic device holder that holds the personal electronic device at the proper angle for viewing and communicating through the screen and allows one to edit their texts or interact with their phone screen, either directly or with the use of a touch pad mouse that only requires the use of one finger.

Disclosed is a wearable personal electronic device holder, which is made up of the following components: (1) a wearable device that is worn around the neck and rests on the torso (e.g, the breast bone or solar plexus) that may include a magnet which will attach through most clothing or on top of clothing to (2) a support portion that includes a protruding movable arm that extends outward from the user's chest area to hold a personal electronic device, for example in a secure cradle which is supported by a ball and socket joint that can pivot the electronic device. In some embodiments, a wire is provided to attach the personal electronic device to a touch pad mouse.

The wearable portion may be made of a form of metal or plastic and attach around the neck via a magnet or a clip. The support portion can be made of plastic or hard material that may bend or stay rigid and the arm can fold into itself manually or electronically or it can stay protruding out. The personal electronic device retainer at the other end of arm can be made of any cloth, plastic or a hard material as long as the device is held securely and the personal electronic device may attach to the arm via a magnet or strap or clip. The retainer may be attached to a ball and socket joint and may move manually or electronically.

The disclosed device is unique when compared with other known devices and solutions because it provides a comfortable way to wear a personal electronic device that helps reduce "tech neck" and enables better posture. Further, the disclosed device provides the ability to extend the arm of the wearable device to the appropriate selfie length (e.g., approximately arms reach), while avoiding the appearance of a double chin. The disclosed device allows one to walk around, lay down, or sit and talk or view their personal electronic device while wearing the device. People who have neck or arm injuries, or limited use of their hands or arms will be able to use the disclosed device since, while using the device disclosed herein to support the personal electronic device, the personal electronic device can be used with a finger touch (either directly on the screen or using a mouse) and voice activation. In some instances, another person can attach the wearable device for the injured person as one would help someone to get dressed in the morning.

In some embodiments, the wearable portion can be worn under the clothes so that it is discreet. Further, the arm of the device is preferably configured such that it is not in view in pictures or videos taken with the personal electronic device supported by the arm. Further, the device can fold up easily for compact storage. The device can be used by people with neck or arm injuries or who have limited use of their arms or fingers.

In various embodiments, the device includes a lightweight, comfortable wearable portion that connects around the neck (e.g., via a magnet) with a soft material wrapped around it so it sits comfortably around the back of the neck. The elongate member that is worn around the neck of the user is preferably rigid enough to bear the weight of the apparatus but soft enough to be comfortable. The device further includes a coupler that rests on the torso (e.g., breast bone) and may have a soft backing so it comfortably rests on the skin. In various embodiments, the coupler includes one or more magnets for coupling to the support portion. In some embodiments, the wearable portion includes two small posts that can extend out and rest on the rib cage horizontally to stabilize the device. The support portion that holds the personal electronic device can have a magnet that attaches over or through clothing to the coupler. In some embodiments, the sturdy plastic light weight arm is able to move from side to side as it hinges from the area of the breast bone magnet so the user can view the personal electronic device from the side if necessary. The arm can be pulled in closer to the body if not needed to be at arm's length for selfie videos. In some embodiments, the opposite end of the arm has another magnet that can be used to attach the personal electronic device. In some embodiments, the retainer further includes a stretchable plastic that can be used to secure a personal electronic device if needed for safety or security. In such embodiments, the personal electronic device may have a metal strip attached to the back to attach to the magnet. The retainer can be attached to the arm via a ball and socket joint so the personal electronic device can move from side to side. In some embodiments, a cord runs down the arm of the device so the user can use a touch pad mouse to utilize the personal electronic device like a computer.

The presently disclosed device is a discreet, light weight, and wearable portable electronic device holder that holds a portable electronic device either close to the body near the chest to be able to view the portable electronic device or use the arm feature of the device to extend the portable electronic device outward to arm's length to be able to video chat, read, view, play games and record selfie videos or take videos or photographs. The device can be used to hold a portable electronic device so the user can be truly hands free. With this device, users can now fully utilize their personal electronic device for talk-to-type and can use a mouse to edit incorrect typing, take selfie pictures or videos at the proper level to avoid a "double chin" look, take non-selfie pictures or videos, play games, read, watch videos standing, sitting or lying down (without hitting themselves in the face with the device), conduct video calls or conferences or a standard phone call without holding the phone. Furthermore, it should be noted that people with "tech neck," neck or arm injuries, or hand or wrist issues may be able to use this device with minor assistance from someone else. Further, by positioning the personal electronic device at arm's length, the device encourages proper posture.

FIGS. 1-4 show an embodiment of a device 100 including a wearable portion 102 and a support portion 104. The wearable portion 102 includes an elongate member 106 and a coupler 108 connected to the elongate member 106. The elongate member 106 is formed in a loop such that it is positionable around a neck of a user with the coupler 108 positioned on a torso of the user, as shown in FIG. 1. The elongate member 106 can be provided in a variety of lengths such that users of different heights can select the most appropriate length for comfort and usability. In some embodiments, the coupler 108 may be adjustable (e.g., slidable) along the length of the elongate member to enable a user to customize the fit of the device 100. Further, the shape of the elongate member 106 can be adjustable. For example, an adjuster can be attached to the elongate member 106 such that the adjuster can be slid along the length of the elongate member 106 to hold portions of the elongate member 106 together, similarly to the adjusters commonly found on headphone cables.

Figure 8:
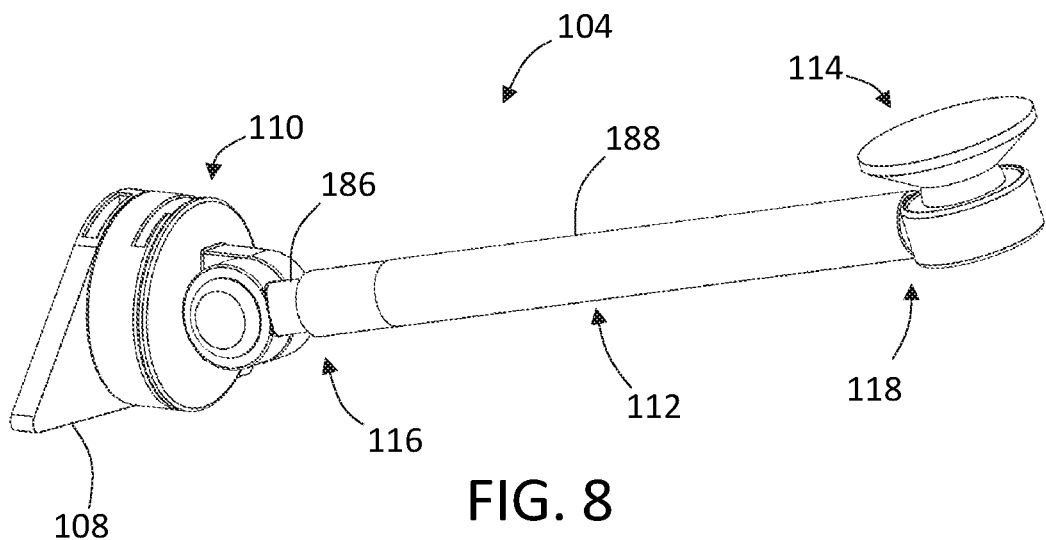
FIG. 8 shows a perspective view of a device according to one embodiment in which the elongate member of the wearable portion is not shown.
Figure 17:
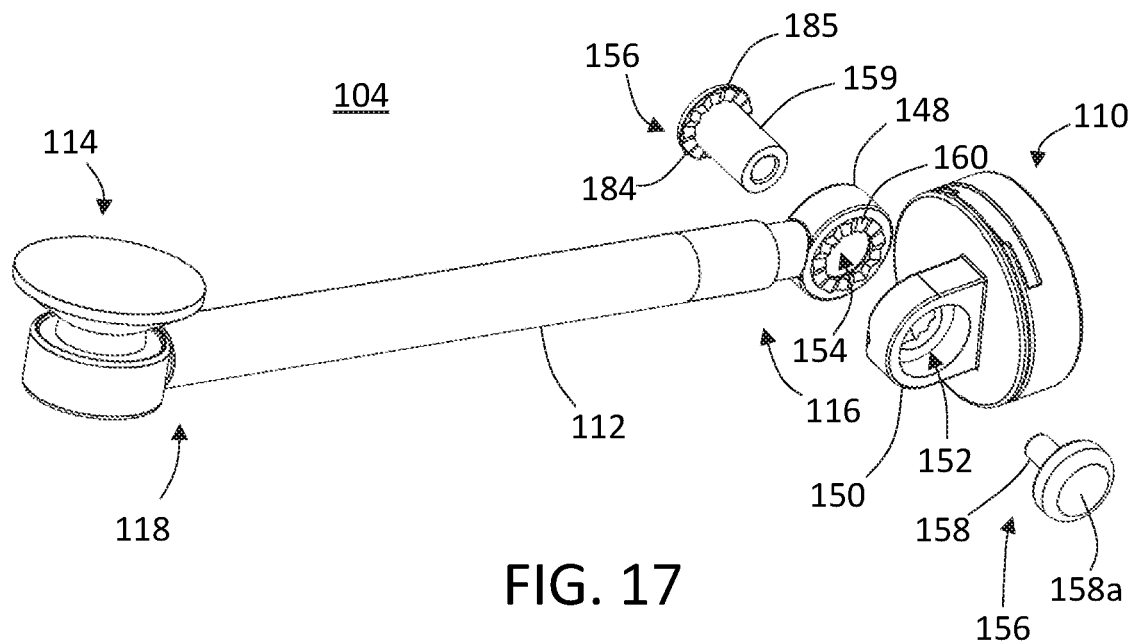
FIG. 17 is a first partial exploded view of the support portion of the device of FIG. 8.
Figure 18:
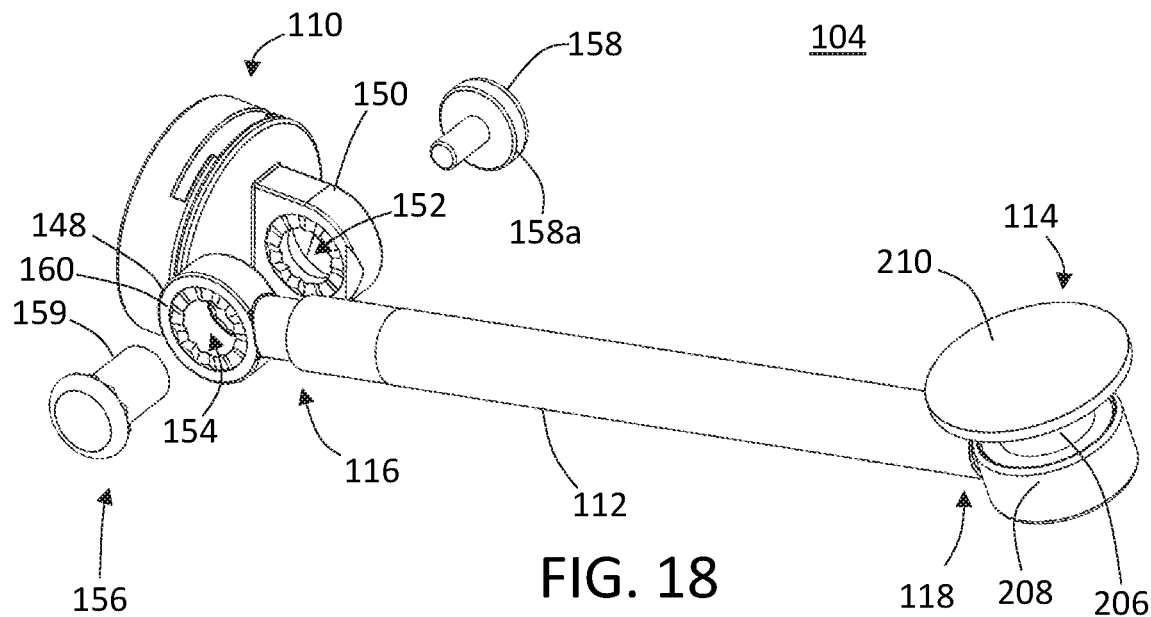
FIG. 18 is a second partial exploded view of the support portion of the device of FIG. 8.

As shown in more detail in FIGS. 8 and 17-18, for example, the support portion 104 includes an attachment member 110, an arm 112, and a retainer 114. The arm 112 extends from a first end 116 to a second end 118. The first end 116 is coupled to the attachment member 110. The retainer 114 is coupled to the second end 118 of the arm 112. The retainer 114 is configured to retain a personal electronic device 119 (shown in FIG. 4). One of ordinary skill in the art will understand that although the devices are described as supporting personal electronic devices, other objects, such as books or magazines, could be supported by the device by adapting the retainer. The attachment member 110 of the support portion 104 is releasably attachable to the coupler 108 of the wearable portion 102 such that, with the attachment member 110 attached to the coupler 108, the device 100 supports the personal electronic device 119.

Figure 2:
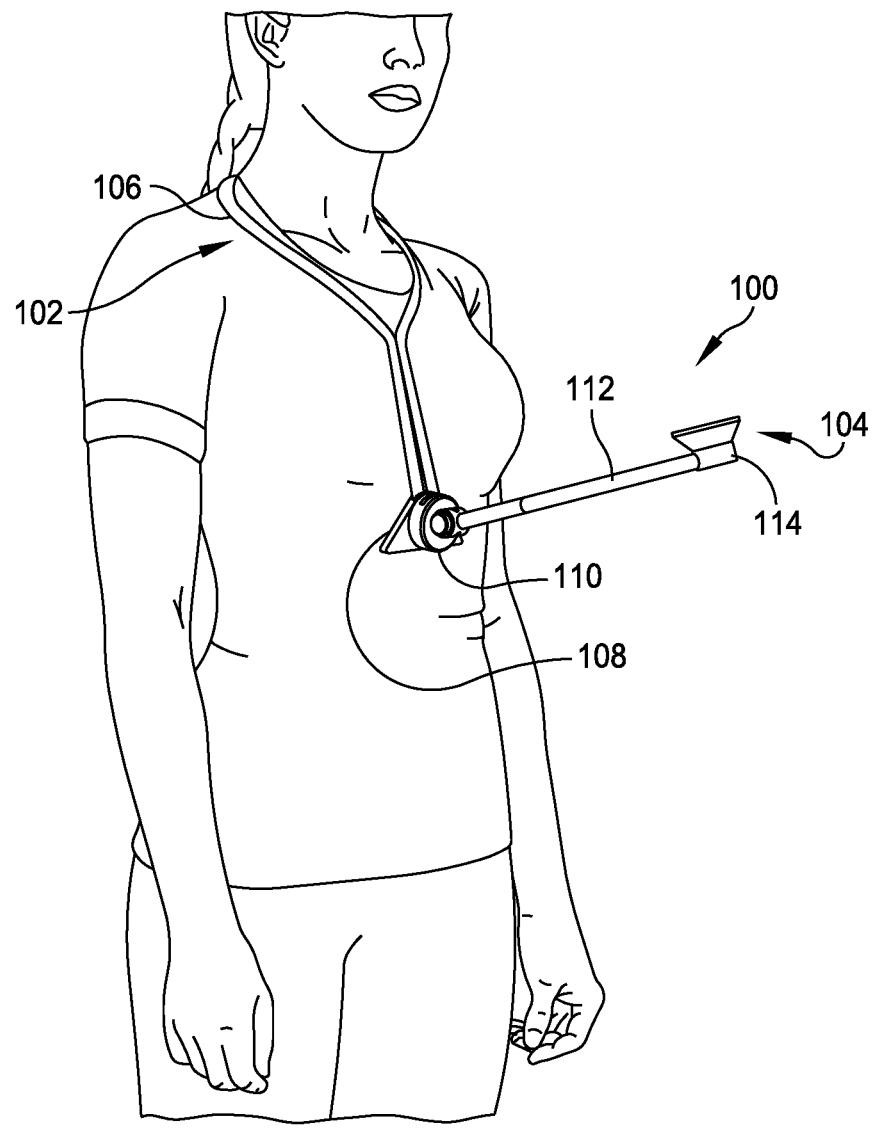
FIG. 2 shows the support portion of the device connected to the wearable portion of FIG. 1.
Figure 3:
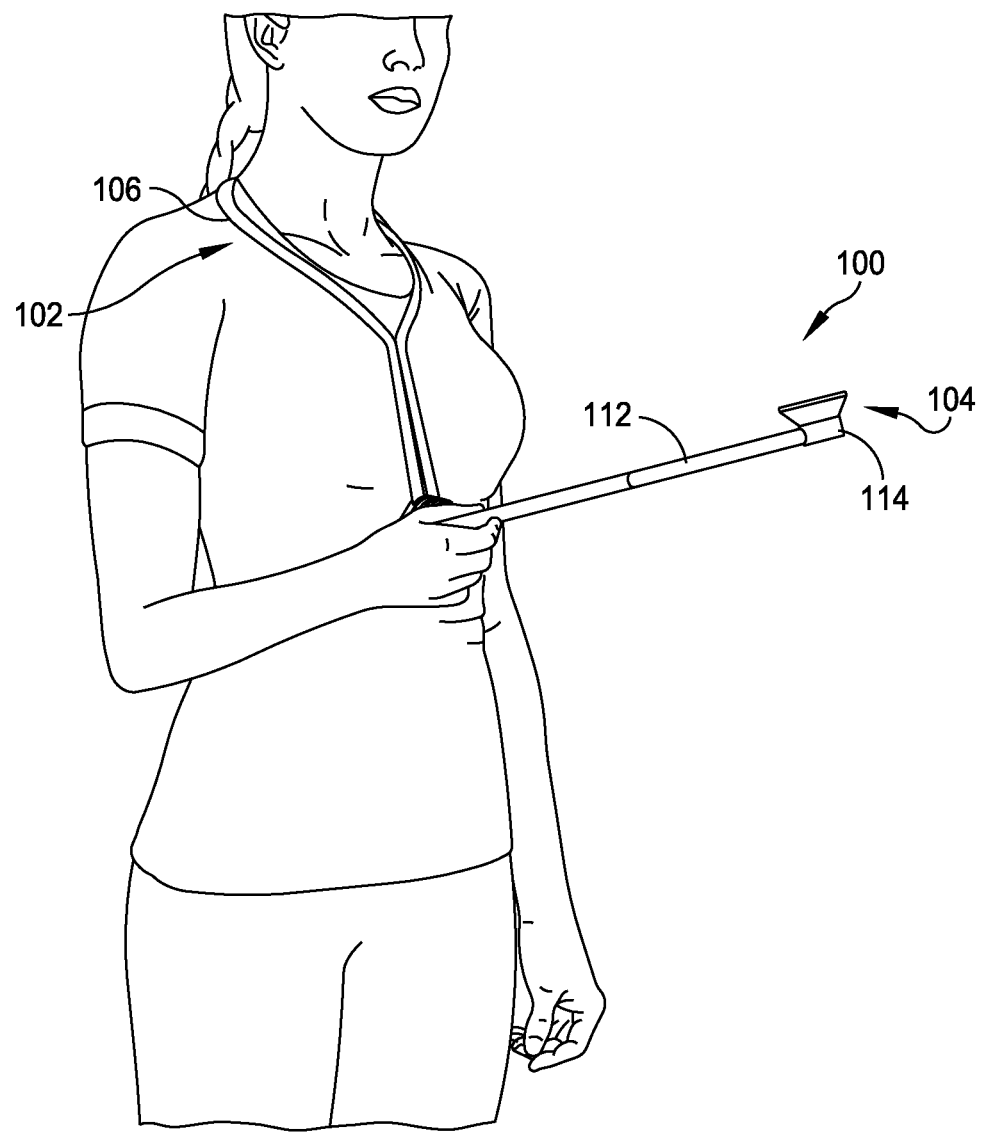
FIG. 3 shows the device of FIG. 2 with the arm of the support portion extended.
Figure 4:
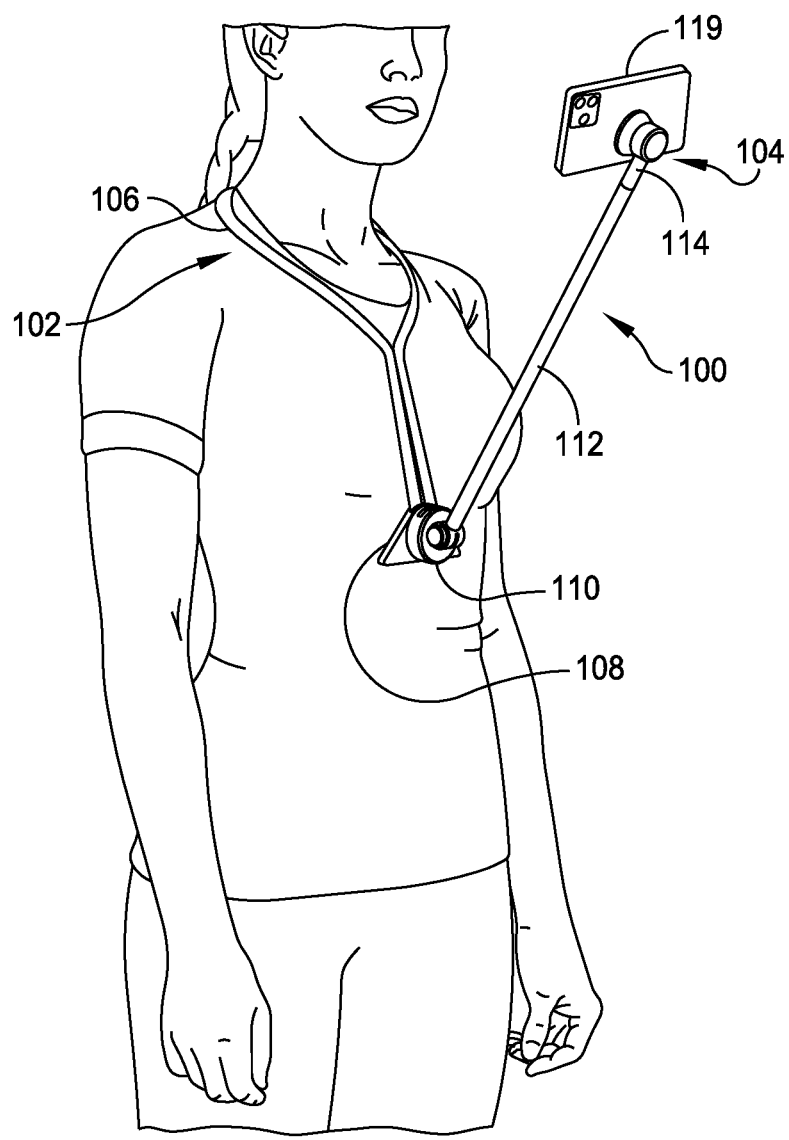
FIG. 4 shows the device of FIG. 2 with the arm pivoted toward the user and with a personal electronic device retained by the retainer of the support portion.

FIGS. 2-4 show the support portion 104 connected to the wearable portion 102. As described in more detail herein, the attachment member 110 can be configured to releasably connect to the coupler 108—for example, using magnets—such that the support portion 104 can be easily connected and disconnected from the wearable portion 102. Further, as shown in FIG. 3, the arm 112 of the support portion 104 may be extendable such that the position of the retainer 114—and, thereby, the personal electronic device 119—relative to the user's face is adjustable. The arm 112 can also be pivoted toward or away from the user, as shown in FIG. 4, to provide the desired distance from the user to the personal electronic device 119.

Figure 5:
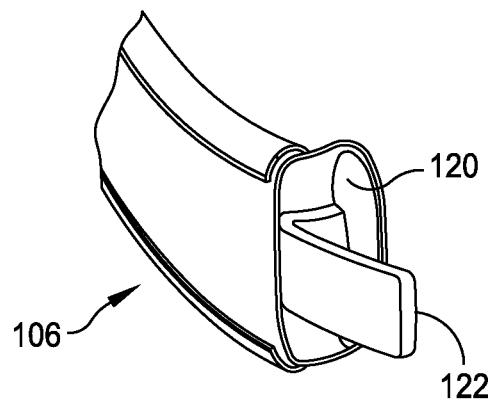
FIG. 5 shows a cross-sectional view of an elongate member of the wearable portion of the device, according to one embodiment.

The elongate member 106 can be any appropriate member that can support the coupler 108 when worn around the user's neck. For example, as shown in FIG. 5, the elongate member 106 can include a layer of foam 120 (e.g., neoprene) configured to rest against the user. The elongate member 106 can further include a rigid member 122 of cable stock or other relatively rigid material to provide structural support. The combination of the foam 120 and the rigid member 122 provides a comfortable interface with the user's skin. In other embodiments, the elongate member 106 is constructed from leather, nylon webbing, or other suitable material as will be understood by one of ordinary skill in the art.

Figure 6:
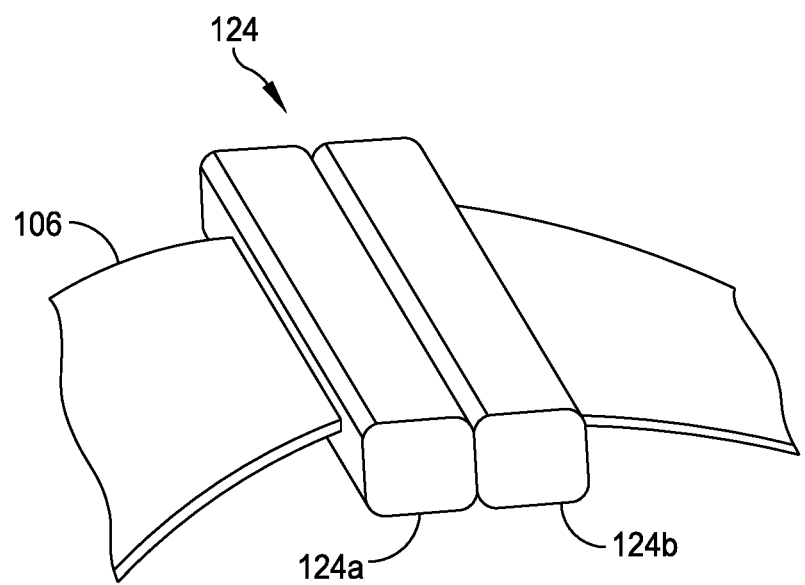
FIG. 6 shows a clasp of the wearable portion of the device, according to one embodiment.

Further, as shown in FIG. 6, the elongate member 106 can include a clasp 124. The clasp 124 includes a first clasp portion 124a attached to a first section of the elongate member 106 and a second clasp portion 124b attached to a second section of the elongate member 106. The first 124a and second 124b clasp portions can be selectively coupled and uncoupled to allow for easy placement around the user's neck. The clasp 124 can use magnets, a buckle, or other mechanical means of coupling. For example, one of the first 124a and second 124b clasp portions can include a magnet with a groove formed therein and the other of the first 124a and second 124b clasp portions can include a magnet with a complementary projection to engage the groove and retain the first clasp portion 124a with respect to the second clasp portion 124b.

The elongate member 106 can be connected to the coupler 108 in any appropriate manner. For example, in some embodiments, the elongate member 106 extends through apertures in the coupler 108. In other embodiments, the elongate member 106 is releasably connected to the coupler 108 via mechanical clasps or buckles.

Figure 7:
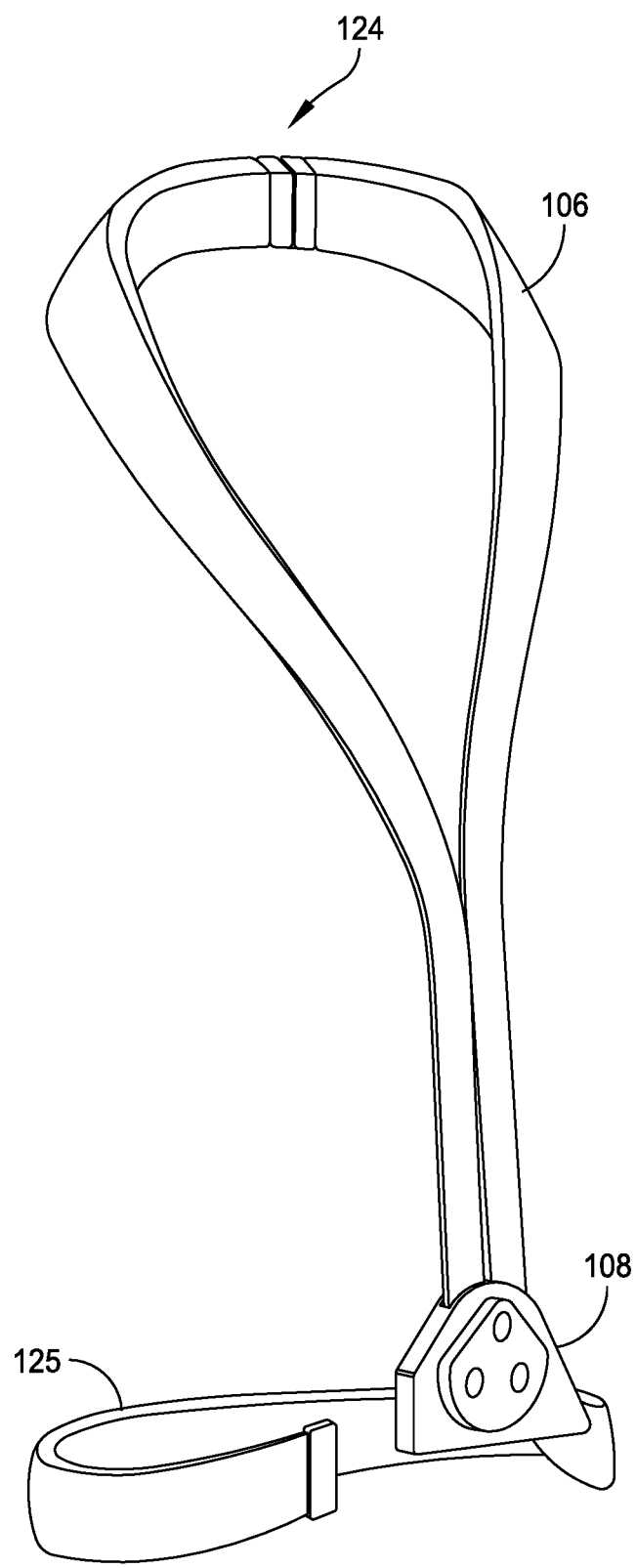
FIG. 7 shows a wearable portion of the device, according to another embodiment in which the wearable portion includes a second elongate member configured to be positioned around the torso of the user.

In some embodiments, as shown in FIG. 7, the wearable portion 102 further includes a second elongate member 125 attachable to the coupler 108. The second elongate member 125 is configured to be worn around the user's torso to retain the coupler 108 in position on the user's torso. One or both ends of the second elongate member 125 can be releasably attachable to the coupler 108 to allow the second elongate member 125 to be positioned around the user's torso. The second elongate member 125 can be attachable to the coupler 108 using magnets, buckles, clips, or other mechanical means as will be understood by one of ordinary skill in the art. In some embodiments, the second elongate member 125 is constructed in the same manner as the elongate member 106. In use, the second elongate member 125 prevents movement of the coupler 108 to maintain the support portion 104 and, thereby, the personal electronic device 119 in position. This can significantly improve the usability of the device 100 and the quality (e.g., stability) of videos and images captured with a personal electronic device 119 connected to the device 100.

Figure 9:
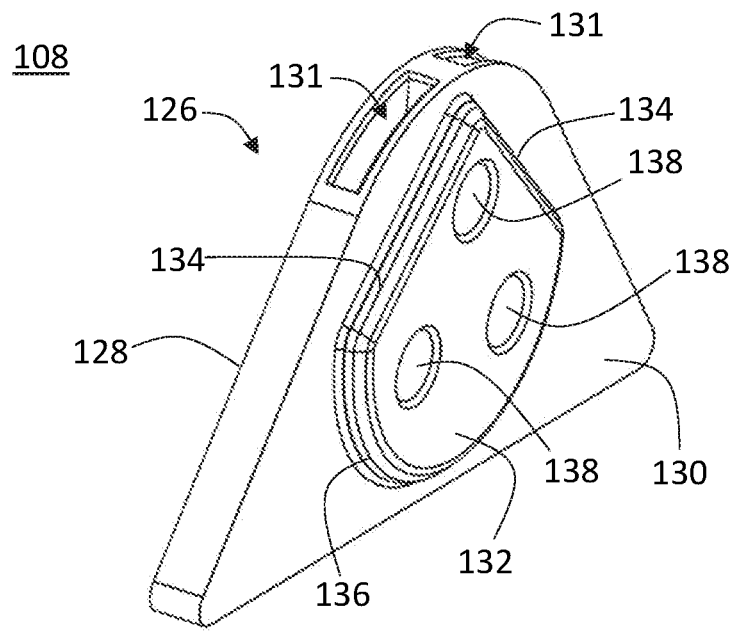
FIG. 9 is a perspective view of the coupler of the device of FIG. 8.
Figure 10:
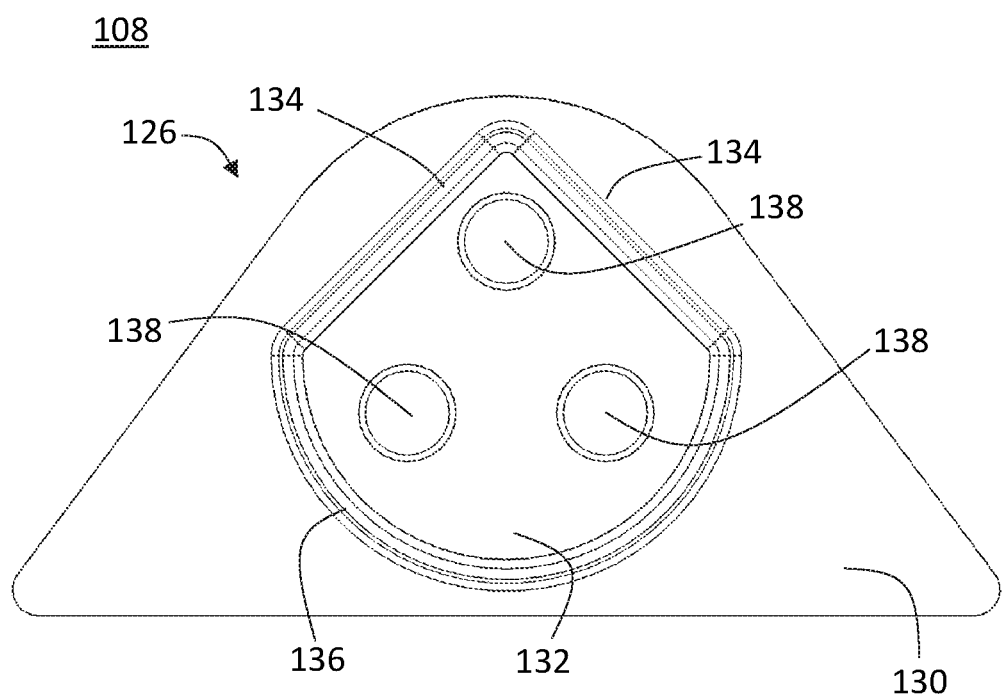
FIG. 10 is a front view of the coupler of FIG. 9.
Figure 11:
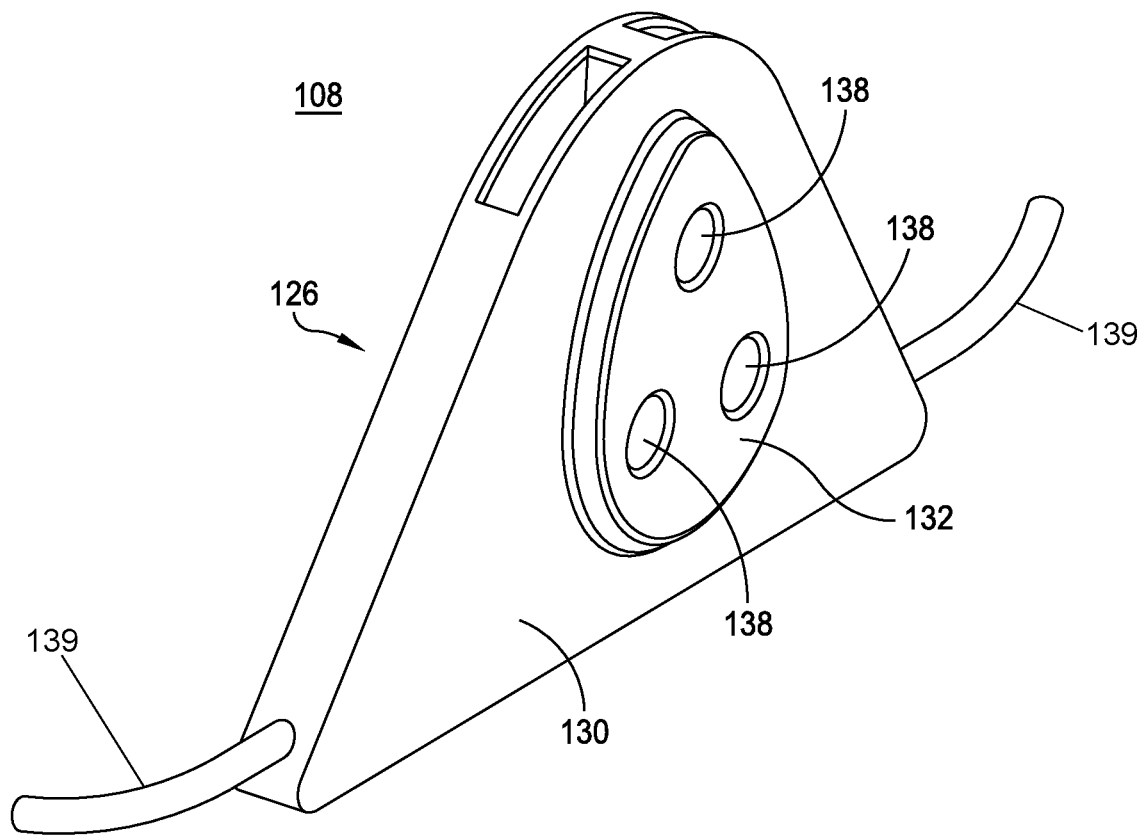
FIG. 11 is a perspective view of a coupler according to another embodiment.

FIG. 8 shows the device 100 in more detail with the elongate members 106 and 125 hidden. FIGS. 9 and 10 show perspective and front views, respectively, of the coupler 108. The coupler 108 includes a body 126 that has a first side 128 that is intended to be placed against the user and an opposite second side 130. In some embodiments, a layer of foam or other deformable material is affixed to the first side 128 of the body 126 to provide a comfortable surface for contact with the user. Further, the coupler 108 can also include a protective material on the second side 130 to protect clothing from damage caused by the coupler 108 (e.g., so that the clothing does not "snag" on the magnets 138 (described below)). The body 126 can define one or more apertures 131 that are configured to receive the elongate member 106 to attach the coupler 108 to the elongate member 106. The body 126 further includes a boss 132 extending outward from the second side 130. As described in more detail below, the boss 132 is configured to engage a pocket in the attachment member 110 to help retain the attachment member 110 in place. The engagement of the boss 132 with the pocket also ensures that the support portion 104 is properly oriented with respect to the coupler 108. For example, the boss 132 can have two straight sides 134 and one semi-circular side 136 such that the boss 132 takes a form similar to the outline of a baseball infield. In other embodiments, the boss 132 is rectangular, triangular, a teardrop shape (as shown in FIG. 11), or any other appropriate shape. Preferably, the boss 132 is configured to rotationally orient the support portion 104. In other embodiments, the body 126 includes a pocket extending into the second side of the body 126 for interfacing with a boss of the attachment member.

The coupler 108 can further include one or more magnets 138 coupled to the body 126 and configured to engage magnets on the attachment member 110 as described in more detail herein. The magnets 138 can be, for example, embedded in or otherwise supported by the body 126. In some embodiments, the coupler 108 includes more than one magnet 138 to more securely retain the attachment member 110 (e.g., three magnets, five magnets, or any other suitable number of magnets). In some embodiments, the magnets 138 are arranged in a triangular configuration. In some embodiments, the magnets 138 are positioned within the boss 132 and one end of the magnets 138 are exposed.

Preferably, the wearable portion 102, and particularly the coupler 108, is configured to be worn under the user's shirt. This allows the wearable device to be worn discreetly when the support portion 104 is not attached while also allowing for the quick attachment of the support portion 104 (e.g., via the one or more magnets 138) when the user wishes to use the device 100 to support a personal electronic device.

In some embodiments, such as the embodiment shown in FIGS. 9 and 10, the body 126 is triangular such that the bottom of the body 126 is wider than the top. The wider bottom portion of the body 126 may be configured to extend across the user's torso from left to right such that the body 126 bears against the user to provide support for the support portion 104, as shown in FIG. 1. The wider bottom portion of the body 126 increases the contact with the user to help stabilize the personal electronic device 119. Alternatively, or additionally, as shown in FIG. 11, the coupler 108 can include posts 139 extending laterally outward from the body 126 such that they extend across the user's torso to support the support portion 104. In some embodiments, the posts 139 can be curved to contour to the curvature of the user's torso and increase contact with the user's torso. Optionally, the posts 139 can be formable by the user.

FIG. 11 shows another embodiment of the coupler 108 having a body 126 in which the boss 132 is in the form of a teardrop shape. As noted above, the shape of the boss 132 can be chosen to locate and orient the support portion 104. The shape of the boss 132 can further be configured to be aesthetically pleasing.

Figure 12:
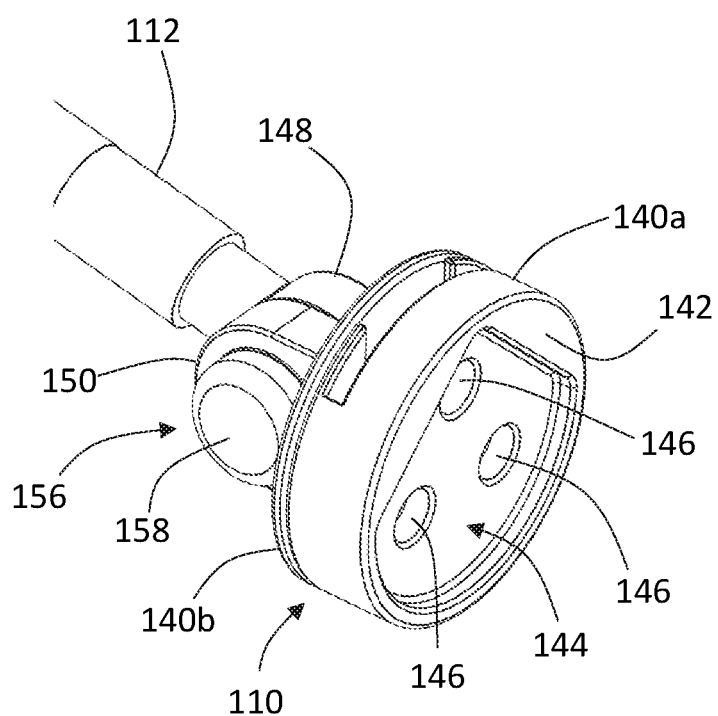
FIG. 12 is a partial rear perspective view of the support portion of the device of FIG. 8.

FIGS. 12-19 show one embodiment of the support portion 104, and components thereof, in more detail. The attachment member 110 includes a first body 140a (shown in detail in FIG. 14) and a second body 140b (shown in detail in FIGS. 15 and 16). The first body 140a has a first side 142 (shown in FIG. 12) configured to engage with the coupler 108 of the wearable portion 102 and an opposing, second side 143 (shown in FIG. 14). As shown in FIG. 12, the first body 140a can define a pocket 144 extending into the first side 142 of the first body 140a and configured to receive the boss 132 of the coupler 108. In one embodiment, the attachment member 110 includes one or more magnets 146 to engage with the magnets 138 of the coupler 108. The attachment member 110 can include multiple magnets 146 (e.g., three magnets) to allow a secure coupling of the support portion 104 to the wearable portion 102. The magnets 146 can, for example, be embedded in the first body 140a. One end of the magnets 146 can be exposed to allow for engagement with the magnets 138 of the coupler 108.

The second body 140b includes a clevis portion 150 for attaching to the arm 112. The second body 140b can further include a first plate 174 from which the clevis portion 150 extends and a second plate 176 spaced apart from the first plate 174 and coupled to the first plate 174 by a spacer 178. The first body 140a defines a slot 180 extending into the first body 140a from the perimeter of the first body 140a and configured to receive the second plate 176 of the second body 140b to couple the second body 140b to the first body 140a. The first body 140a can further define an aperture 182 extending from the second side 143 of the first body 140a to the slot 180 to allow passage of the spacer 178 of the second body 140b. The engagement of the first body 140a and the second body 140b is shown, for example, in FIG. 13.

The engagement of the first 140a and second 140b bodies may allow for an additional degree of freedom in positioning the personal electronic device 119. For example, the second body 140b may be rotatable about an axis 'A' (shown in FIGS. 14 and 16) that is substantially perpendicular to the second side 143 of the first body 140a, and which may be oriented in a substantially anterior-posterior orientation when the device 100 is worn by the user. This additional degree of freedom may allow the user to position the personal electronic device to the user's left or right by rotating the second body 140b about the axis A and pivoting the arm 112, as described herein. The second plate 176 is preferably circular to allow for rotation of the second plate 176 within the slot 180 about axis A.

Figure 13:
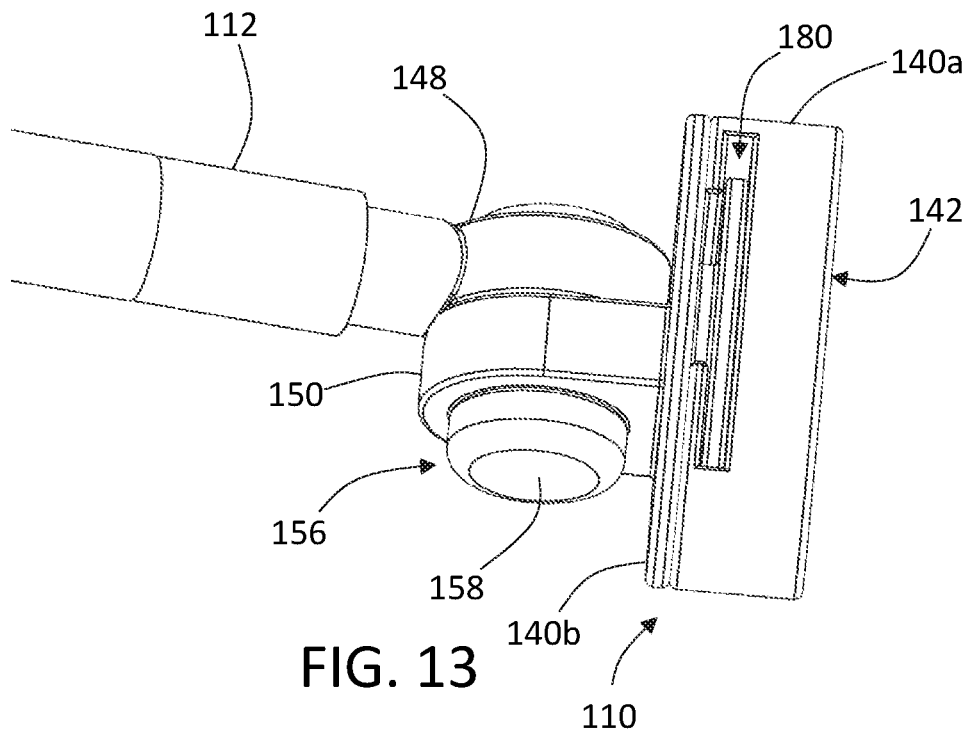
FIG. 13 is a partial top perspective view of the support portion of FIG. 12.
Figure 14:
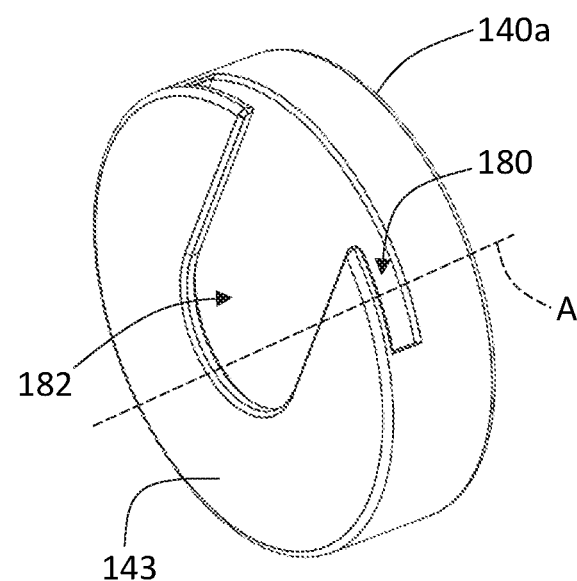
FIG. 14 is a perspective view of the first body of the attachment member of the support portion of FIG. 12.
Figure 15:
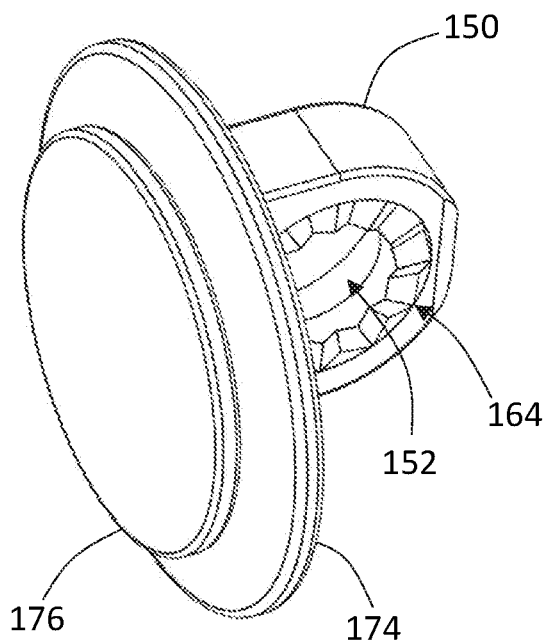
FIG. 15 is a perspective view of the second body of the attachment member of the support portion of FIG. 12.
Figure 16:
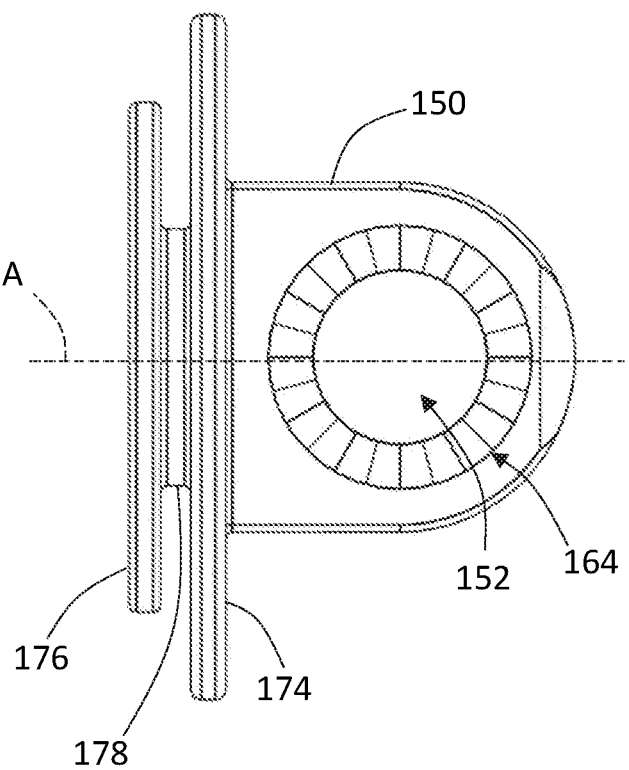
FIG. 16 is a side view of the second body of FIG. 15.

As shown, for example, in FIG. 13, the arm 112 is pivotably coupled to the attachment member 110 such that the position of the retainer 114—and, thereby, the personal electronic device—is adjustable. The arm 112 can include an eyelet 148 at the first end 116 of the arm 112 that can be at least partially cylindrical. As noted above, the attachment member 110 can include a clevis portion 150. As shown, for example, in FIGS. 17 and 18, the eyelet 148 defines a first bore 152 and the clevis portion 150 defines a second bore 154, each configured to receive an engagement pin 156 that couples the arm 112 to the attachment member 110.

In some embodiments, as best shown in FIGS. 17 and 18, the engagement pin 156 includes a first member 158 and a second member 159 coupled together within the first bore 152 and the second bore 154. The first member 158 can include a flange 158a that can be used as a button that can be depressed to selectively release the arm 112 to pivot about the engagement pin 156.

Figure 19:
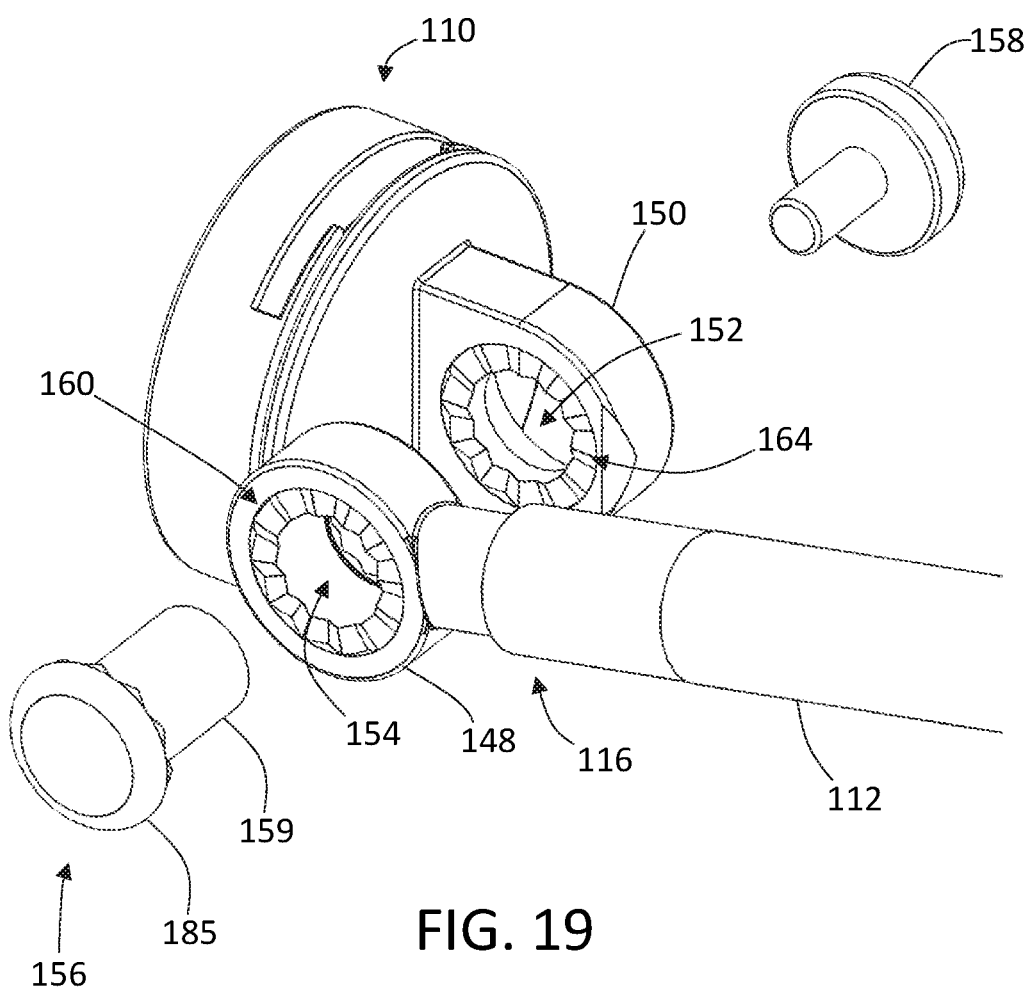
FIG. 19 is a detail partial exploded view of the support portion of the device of FIG. 8.

In some embodiments, as best shown in FIGS. 17-19, the eyelet 148 includes a plurality of teeth 160 circumferentially spaced around opposing faces of the eyelet 148 and the clevis portion 150 includes a plurality of complementary recesses 164 configured to engage the teeth 160 on one of the faces of the eyelet 148. Further, the second member 159 of the engagement pin 156 can include recesses 184 on a flange 185 of the second member 159 such that the recesses 184 are configured to engage the teeth 160 on the opposite side of the eyelet 148. In such embodiments, the engagement of the teeth 160 with the recesses 164, 184 is configured to retain the arm 112 in one of a plurality of angular orientations. It should be understood that the arrangement of the teeth and recesses can be reversed. The attachment member 110 can further include a biasing member—such as a spring or other elastic member—to bias the engagement pin 156 in a locked position with the first member 158 in an outward position. In the locked position, the engagement pin 156 secures the teeth 160 in the recesses 164, 184 to lock the arm 112 in a desired angular position. In such embodiments, depression of the first member 158 moves the engagement pin 156 to an unlocked position and disengages the teeth 160 from the recesses 164, 184 to allow for rotation of the arm 112.

In other embodiments, the rotational position of the arm 112 is continuously adjustable. In such embodiments, the attachment member 110 can include a locking knob such that rotation of the knob clamps the arm 112 to retain it in position. In such embodiments, the pinching of the eyelet 148 caused by tightening the knob prevents rotation of the arm 112 relative to the attachment member 110.

As shown in FIG. 8, in some embodiments, the arm 112 includes a first portion 186 and a second portion 188 that are telescopically engaged such that the length of the arm 112 can be adjusted, as shown in the transition from FIG. 2 to FIG. 3. The first portion 186 is coupled to the eyelet 148 and extends away from the eyelet 148. The second portion 188 is telescopically engaged with the first portion 186 and is coupled to the retainer 114. The telescopic engagement of the first portion 186 and the second portion 188 allows for adjustment of the length of the arm 112. Although the illustrated embodiment includes only a first portion and a second portion, it should be understood that additional portions can be included to provide further adjustment of the length of the arm 112. The arm 112 can be configured such that the length of the arm 112 can be selectively locked and unlocked in any appropriate manner. For example, in some embodiments, the first 186 and second 188 portions are configured such that rotating the second portion 188 around the longitudinal axis of the arm 112 in a first direction (e.g., clockwise) locks the position of the second portion 188 and rotation in a second, opposite direction (e.g., counter clockwise) releases the second portion 188 for adjustment of the length of the arm 112. In other embodiments, one of the first portion 186 or the second portion 188 include a series of apertures and the other of the first portion 186 and the second portion 188 includes a detent configured to engage one of the apertures to lock the arm 112 at a desired length.

The wearable portion 102 and/or the support portion 104 can be configured for compact storage when not in use. For example, the elongate member 106 can be configured to fold (e.g., by including a hinge point) to allow the wearable portion 102 to be stored in a case, bag, or other container when not in use. The support portion 104 can also be folded and stored in a case, bag, or other container when not in use. By storing the wearable portion 102 and/or the support portion 104 in a container, the magnets 138, 146 can be protected. Thus, the user does not need to be concerned that items will be unintentionally attracted to the magnets 138, 146.

Figure 20:
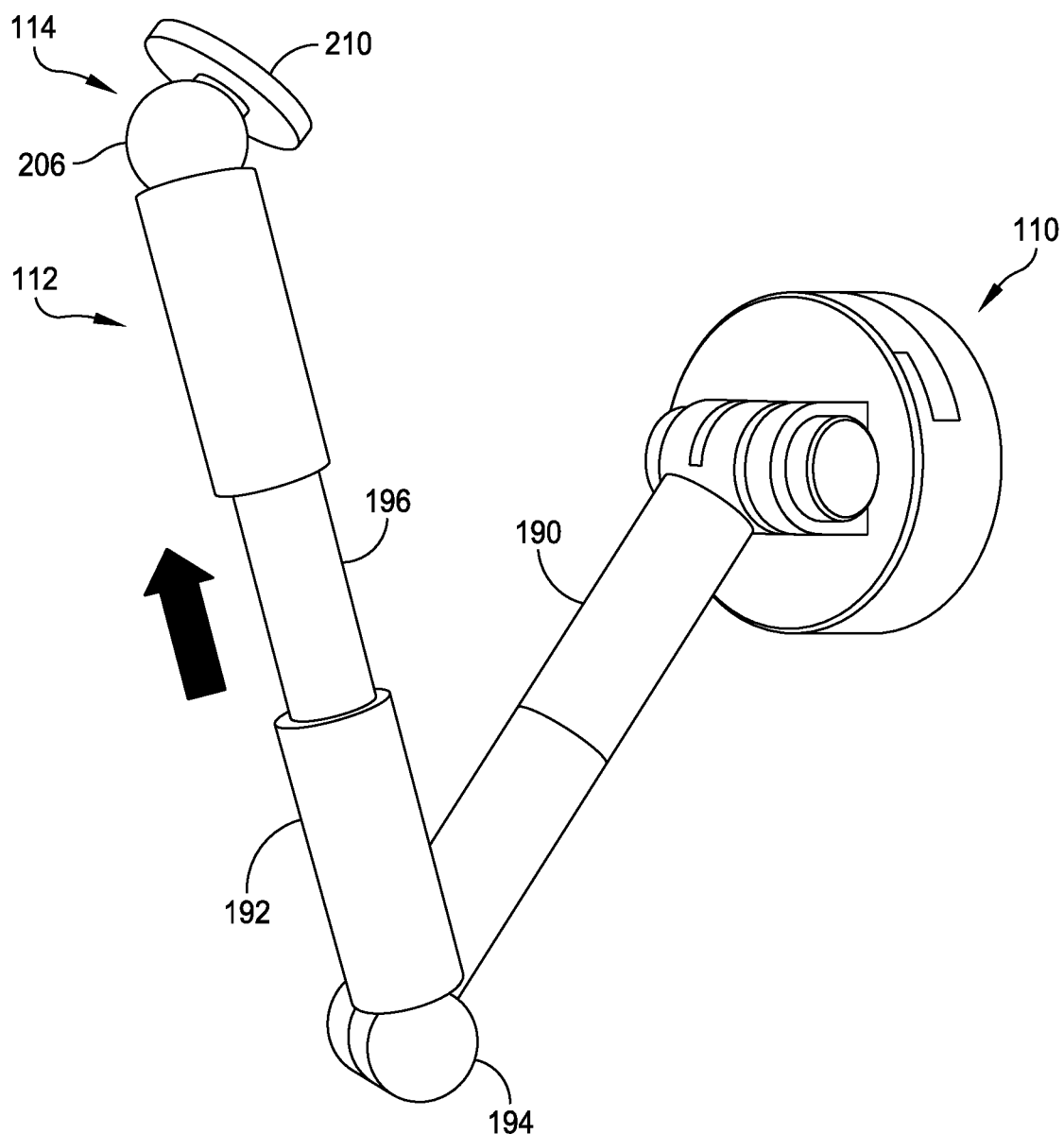
FIG. 20 is a perspective view of an arm of a support portion, according to another embodiment.

In other embodiments, as shown in FIG. 20, the arm 112 is foldable. In such embodiments, the arm 112 includes a first portion 190 and a second portion 192 and the second portion 192 is pivotably coupled to the first portion 190 at a hinge 194. Further, as shown in FIG. 20, one or both of the first portion 190 and the second portion 192 can telescope to provide further adjustment of the arm 112. For example, the arm 112 can include a third portion 196 telescopically coupled to the second portion 192. Such a foldable arm 112 can be stored in a compact folded configuration and then be extended when the user desires to use the device.

Figure 21:
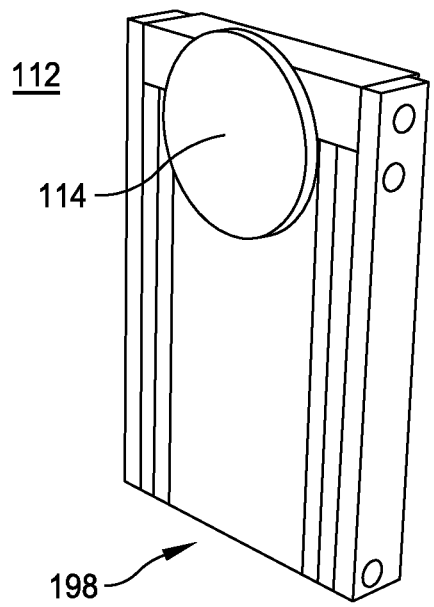
FIG. 21 is a perspective view of an arm of a support portion, according to another embodiment, in a collapsed configuration.
Figure 22:
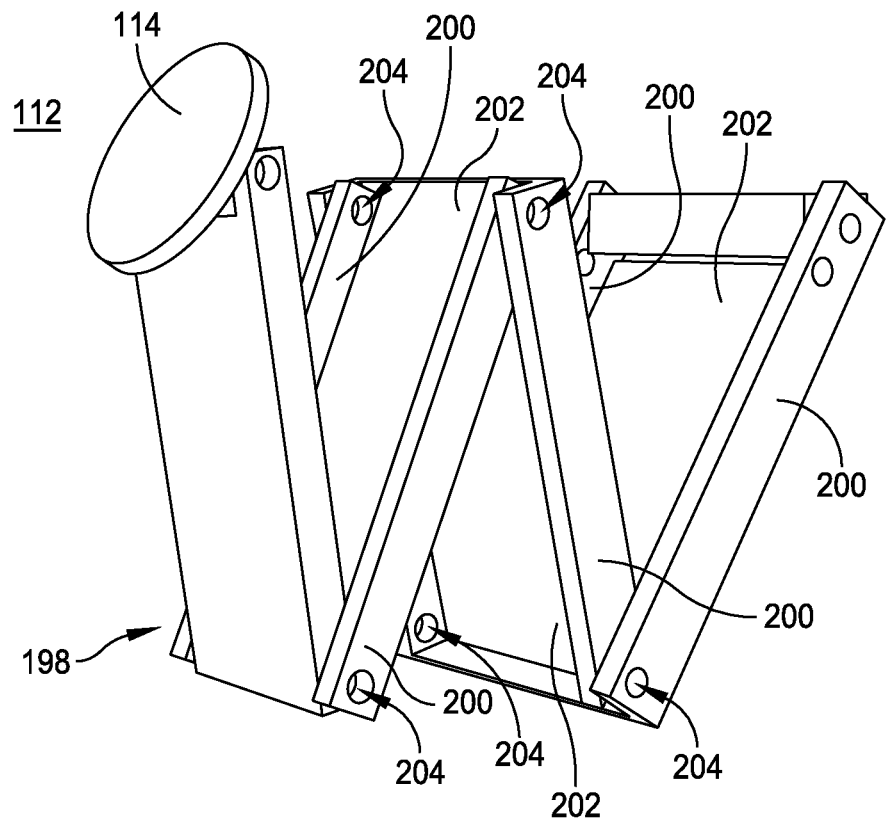
FIG. 22 is a perspective view of the arm of FIG. 21 in a partially extended configuration.
Figure 23:
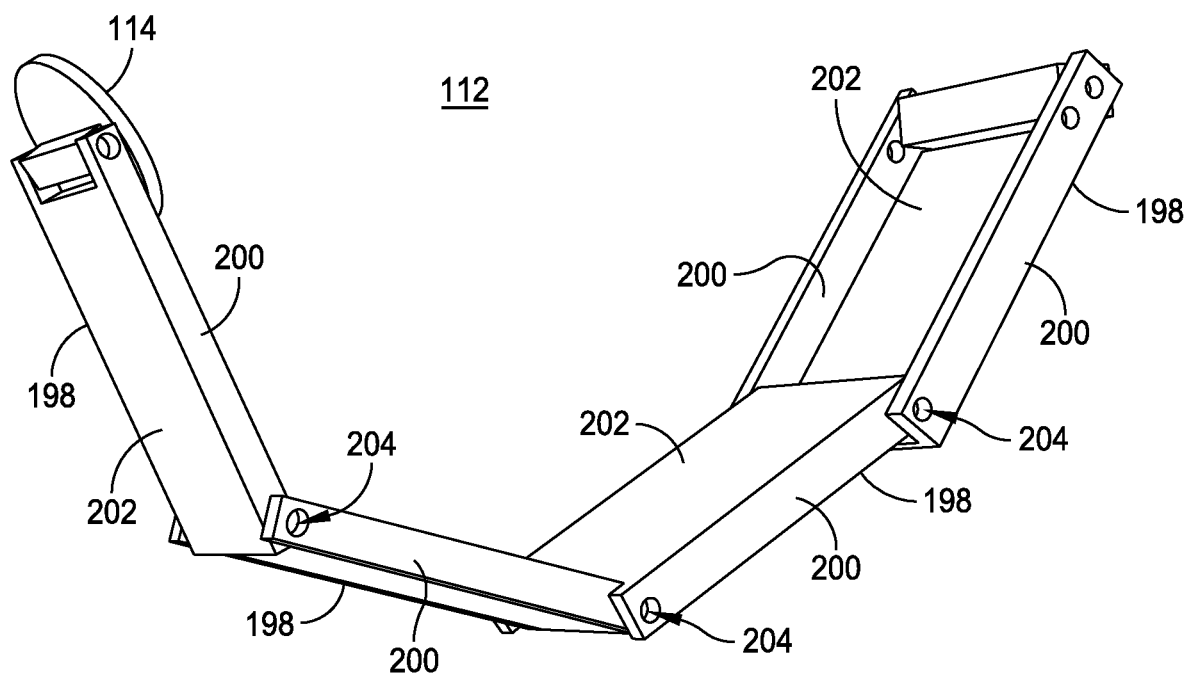
FIG. 23 is a perspective view of the arm of FIG. 21 in a fully extended configuration.
Figure 24:
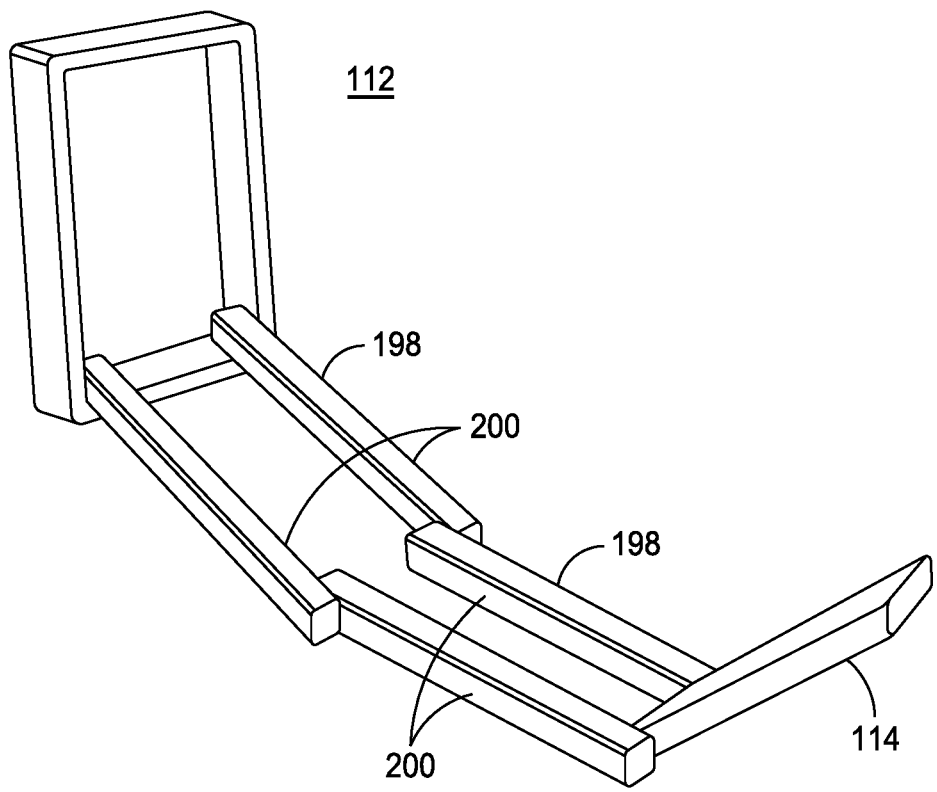
FIG. 24 is a perspective view of an arm of the support portion, according to another embodiment.

A folding arm 112 can include two or more cylindrical shafts, as shown in FIG. 20. Alternatively, as shown in FIGS. 21-24, the arm 112 can include two or more pivotably coupled linkages 198. Each of the linkages 198 can be pinned to another linkage 198 to allow for relative pivoting of one linkage 198 with respect to another. When not in use, the arm 112 can be folded, as shown in FIG. 21. The linkages 198 can be configured to nest within one another such that the arm 112 is compact in the folded configuration. Each linkage 198 can include outer members 200 and a plate 202 connecting the outer members 200 to provide additional rigidity. The outer members 200 can include apertures 204 configured to receive pins to couple one linkage 198 to another. In some embodiments, one or more of the linkages 198 do not include a plate, as shown in FIG. 24. As shown in FIGS. 23-24, when the arm 112 is extended, the arm 112 can take on a concave configuration so that the arm 112 is not in the view of the personal electronic device 119 when the personal electronic device 119 is used to take pictures or record video.

Figure 25:
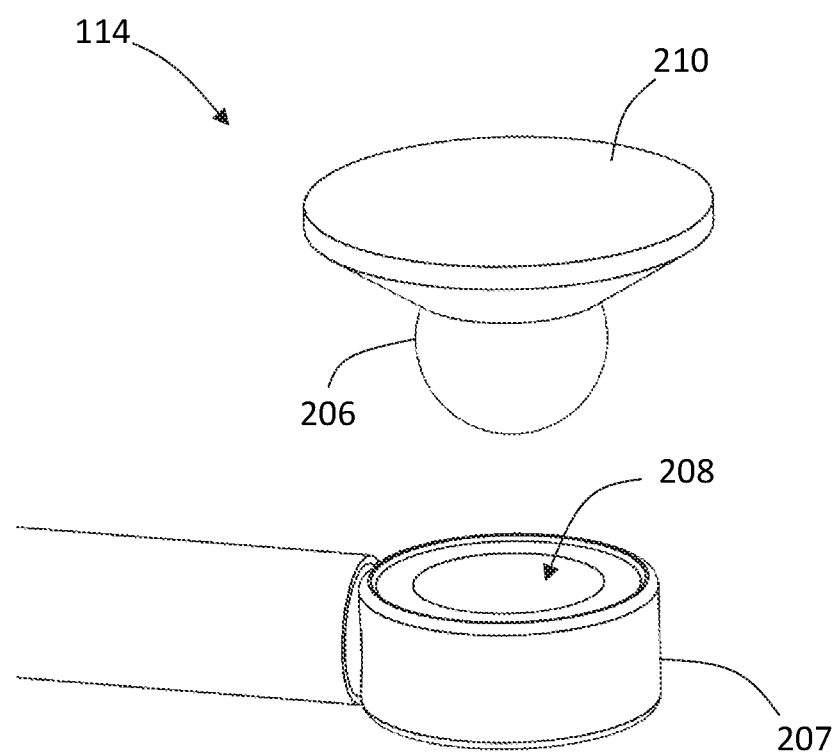
FIG. 25 is an exploded view of the retainer of the device shown in FIG. 8.

As shown in FIGS. 25, in some embodiments, the retainer 114 includes a spherical portion or ball 206 and a receiver 207 coupled to the second end 118 of the arm 112. The receiver 207 defines a socket 208 for receiving the ball 206. The spherical portion 206 is disposed in the socket 208 such that the spherical portion 206 is rotatable in the socket 208 to adjust the angular position of the personal electronic device 119. The spherical portion 206 and the socket 208 can be configured such that the engagement provides sufficient frictional force to maintain the position of the personal electronic device 119 while also allowing the position to be adjusted by the user. The retainer 114 can further include means for tightening the ball and socket joint to restrict movement of the personal electronic device 119. The retainer 114 can also include an engagement portion 210 configured to engage the personal electronic device 119. The engagement portion 210 can include a suction cup, magnet, or other means for engaging the personal electronic device 119. In some embodiments, the engagement portion 210 includes a magnet with an indentation such that a protrusion on a portion of the personal electronic device fits within the indentation to more securely hold the personal electronic device.

In other embodiments, as shown in FIG. 23, the retainer 114 can be pivotably mounted to the arm 112 via a pin. This can allow for the adjustment of the angular position of the retainer 114 and, thereby, the personal electronic device 119.

Figure 26:
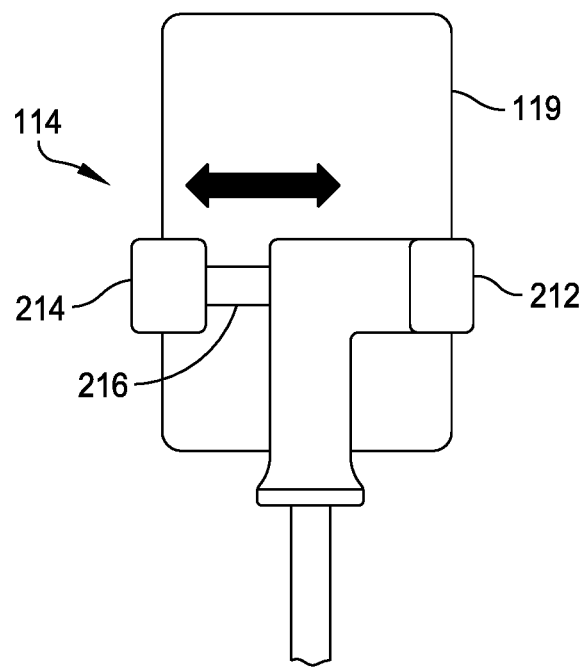
FIG. 26 is a rear view of a retainer of a device according to one embodiment, with a personal electronic device retained by the retainer.
Figure 27:
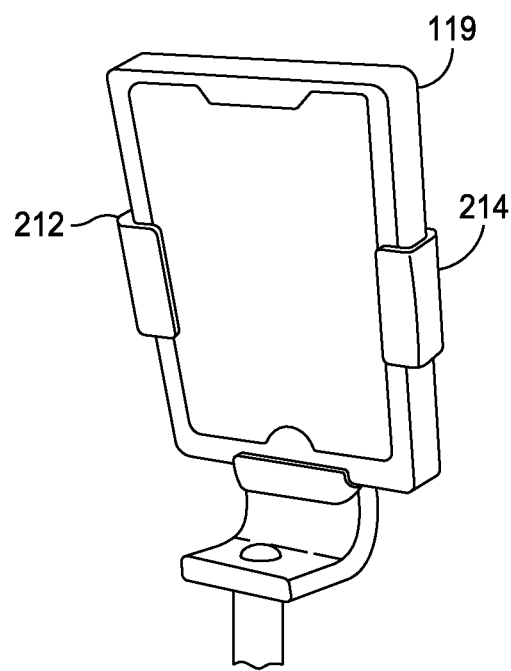
FIG. 27 is a front perspective view of the retainer of FIG. 26.

In other embodiments, as shown in FIGS. 26-27, the retainer 114 can include a frame 212 with a sliding clip 214 configured to engage the perimeter of the personal electronic device 119. The clip 214 can include an adjustable extension 216 that can be adjusted to accommodate different size personal electronic devices. In some embodiments, the retainer 114 includes means for locking the clip 214 in place.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A device, comprising:
   a wearable portion, comprising:
   an elongate member; and
   a coupler connected to the elongate member, the coupler comprising two or more wings extending laterally outward from a center of the coupler, and the coupler further comprising at least one magnet;

wherein the elongate member is formed in a loop such that the elongate member is positionable around a neck of a user with the coupler positioned on a torso of the user; and a support portion, comprising:
an attachment member;
an arm extending from a first end to a second end, wherein the first end is coupled to the attachment member; and
a retainer coupled to the second end of the arm, wherein the retainer is configured to retain a personal electronic device and the retainer comprises a spherical portion;
wherein the attachment member of the support portion is releasably attachable to the coupler of the wearable portion such that with the attachment member attached to the coupler the device supports the personal electronic device, and
wherein the coupler is configured to be worn under the user's clothing and the attachment member and the coupler are configured to be releasably attachable with the user's clothing therebetween.

2. The device of claim 1, wherein the arm is pivotably coupled to the attachment member such that the position of the personal electronic device is adjustable.

3. The device of claim 2, wherein the support portion further comprises a button coupled to the attachment member or to the arm, and wherein the button is configured such that depression of the button releases the arm to pivot with respect to the attachment member.

4. The device of claim 2, wherein the arm is configured to lock into one of a plurality of discrete rotational positions with respect to the attachment member.

5. The device of claim 2, wherein the arm includes a first portion and a second portion, and wherein the first portion is pivotably coupled to the second portion.

6. The device of claim 5, wherein the arm further comprises a third portion pivotally coupled to the second portion.

7. The device of claim 5, wherein the arm further includes a third portion telescopically coupled to the second portion.

8. The device of claim 1, wherein the at least one magnet of the coupler includes a first magnet and the attachment member includes a second magnet such that the attachment member is attachable to the coupler using the first and second magnets.

9. The device of claim 1, wherein the arm comprises a first section and a second section, and wherein the second section is configured to telescope with respect to the first section to adjust a length of the arm.

10. The device of claim 1, wherein the arm includes a socket, and wherein the spherical portion is disposed in the socket such that the spherical portion is rotatable in the socket to adjust an angular position of the retainer relative to the arm.

11. The device of claim 1, wherein the wearable portion further comprises a second elongate member attachable to the coupler, the second elongate member configured to be worn around the torso of the user to retain the coupler in position on the torso of the user.

12. The device of claim 1, wherein the coupler includes a boss and the attachment member includes a pocket, and wherein the pocket of the attachment member is configured to receive the boss of the coupler when the support portion is coupled to the wearable portion.

13. The device of claim 1, wherein the attachment member includes a first body and a second body, and wherein the second body is attachable to the first body such that the second body is rotatable with respect to the first body about an axis that is positioned in a generally anterior-posterior orientation when the device is worn by the user.

14. The device of claim 1, wherein the coupler is triangular with a bottom portion of the coupler wider than a top portion such that the bottom portion of the coupler is configured to rest against the torso of the user and extend laterally across the torso of the user to stabilize the device.

15. A device, comprising:
a wearable portion configured to be wearable by a user, the wearable portion comprising a coupler including a first magnet, the coupler comprising two or more wings extending laterally outward from a center of the coupler; and
a support portion, comprising:
an attachment member including a second magnet;
an arm extending from a first end to a second end, wherein the first end is coupled to the attachment member and the arm comprises a telescoping portion; and
a retainer coupled to the second end of the arm, wherein the retainer is configured to retain a personal electronic device and the retainer comprises a spherical portion;
wherein the attachment member of the support portion is releasably attachable to the coupler of the wearable portion using the first magnet and the second magnet such that with the attachment member coupled to the coupler the device supports the personal electronic device.

16. The device of claim 15, wherein the arm is pivotably coupled to the attachment member such that the position of the personal electronic device is adjustable.

17. The device of claim 15, wherein the coupler includes a boss and the attachment member includes a pocket, and wherein the pocket of the attachment member is configured to receive the boss of the coupler when the support portion is coupled to the wearable portion.

18. The device of claim 15, wherein the attachment member includes a first body and a second body, and wherein the second body is attachable to the first body such that the second body is rotatable with respect to the first body about an axis that is positioned in a generally anterior-posterior orientation when the device is worn by the user.

19. The device of claim 15, wherein the wearable portion further comprises a first elongate member and a second elongate member, each of the elongate members being attachable to the coupler, wherein the first elongate member is formed in a loop and is positionable around a neck of the user with the coupler positioned on a torso of the user, and wherein the second elongate member is configured to be worn around the torso of the user to retain the coupler in position on the torso of the user.

* * * * *